United States Patent
Talbot et al.

[11] Patent Number: 5,812,051
[45] Date of Patent: Sep. 22, 1998

[54] VEHICLE SECURITY SYSTEM

[75] Inventors: Kevin Trevor Talbot, Lichfield; Jeremy John Greenwood, Sutton Coldfield, both of England

[73] Assignee: Rover Group Limited, Warwick, United Kingdom

[21] Appl. No.: 812,060

[22] Filed: Jan. 28, 1997

[30] Foreign Application Priority Data

Feb. 17, 1996 [GB] United Kingdom .................... 9603396
May 31, 1996 [GB] United Kingdom .................... 9611349

[51] Int. Cl.[6] .................................................. B60R 25/10
[52] U.S. Cl. .................... 340/426; 307/10.2; 340/825.69
[58] Field of Search .................... 340/426, 539, 340/825.69, 825.72; 307/10.2, 10.5; 180/287

[56] References Cited

U.S. PATENT DOCUMENTS

| | | | |
|---|---|---|---|
| 3,316,488 | 4/1967 | Reynolds . | |
| 4,087,753 | 5/1978 | Paul | 325/325 |
| 4,399,438 | 8/1983 | Bonner | 340/825.72 |
| 4,697,092 | 9/1987 | Roggendorf et al. | 340/461 |
| 4,940,964 | 7/1990 | Dao | 340/825.69 |
| 5,055,701 | 10/1991 | Takeuchi | 340/825.69 |
| 5,132,660 | 7/1992 | Chen et al. | 340/426 |
| 5,293,527 | 3/1994 | Sutton et al. | 340/825.69 |
| 5,369,706 | 11/1994 | Latka | 340/825.69 |
| 5,508,687 | 4/1996 | Gebhardt et al. | 340/825.65 |

FOREIGN PATENT DOCUMENTS

WO 94/06988  3/1994  WIPO .

*Primary Examiner*—Brent A. Swarthout
*Attorney, Agent, or Firm*—Davis and Bujold

[57] ABSTRACT

A vehicle security system comprises a transmitter 18 for transmitting coded signals, a receiver 16 for receiving the coded signals, and a control unit 14 for operating an engine immobilization system 12 in response to receipt by the receiver 16 of a valid coded signal. The transmitter 18 is arranged to transmit the coded signal as a sequence of pulses of electromagnetic radiation which are amplitude modulated at a modulating frequency, and the receiver includes an audio frequency filter arranged to pass signals having a frequency within a range including said modulating frequency. This allows the filtering out of high powered interfering signals which are of the same radio frequency as used in the system, but which are not modulated at the same audio frequency.

14 Claims, 4 Drawing Sheets

VEHICLE SECURITY SYSTEM

FIELD OF THE INVENTION

The present invention relates to vehicle security systems which include a control means operated in response to the receipt of a coded signal transmitted from a transmitter.

BACKGROUND OF THE INVENTION

One of the problems with vehicle security systems operated by radio frequency transmitters is that interference can affect the operation of the system. This is because the security systems are limited to relatively low power to maximize the life of their batteries, and the frequency used, which is governed by legislation in Europe, is also used by amateur radio operators and buildings security systems. These operate at much higher power outputs. However it is possible to identify ranges of audio frequencies of modulation, for example those above about 4 kHz, in which these interfering signals have very little or no content.

SUMMARY OF THE INVENTION

Accordingly the present invention provides a vehicle security system comprising a security component, a transmitter for transmitting coded radio frequency signals, receiving means for receiving said coded signals, and control means having a code stored therein and being arranged to compare coded signals received by the receiving means with the stored code to determine whether the received codes are valid, and to operate the security component in response to receipt by the receiver of a valid coded signal, wherein the transmitter includes modulating means for producing amplitude modulation of the radio frequency signal at a modulating frequency, and the receiving means includes filter means arranged to pass signals having an amplitude modulation frequency within a range including said modulating frequency.

BRIEF DESCRIPTION OF THE DRAWINGS

Preferred embodiments of the invention will now be described by way of example only with reference to the accompanying drawings in which.

DETAILED DESCRIPTION OF THE PREFERRED EMBODIMENTS

Figure 1:
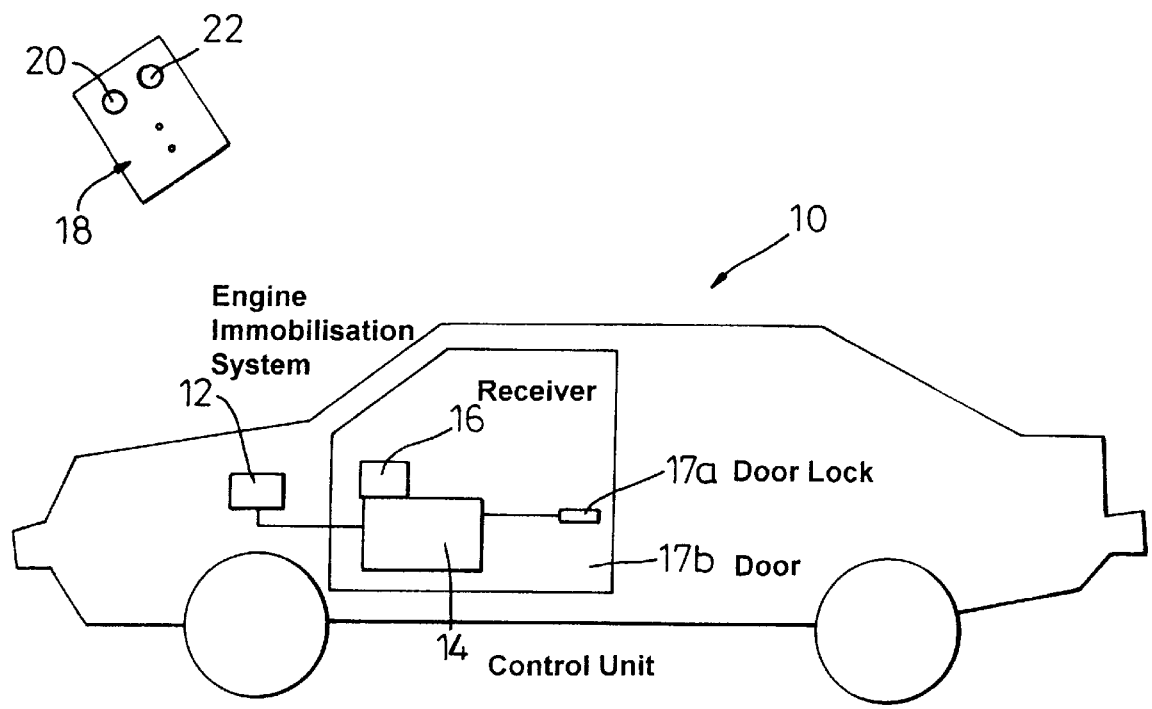
FIG. 1 is a diagrammatic representation of a vehicle security system according to a first embodiment of the invention.

Referring to FIG. 1, a vehicle 10 includes an engine management system operated by an engine control unit 12, and a security control unit 14 connected to the engine control unit and having a radio frequency receiver 16 connected to it. The security control unit can cause the engine control unit to immobilise the engine of the vehicle by cutting out the fuel supply and cutting out the power to the spark plugs. The security control unit can also operate a door lock 17a to lock and unlock a door 17b of the vehicle. A hand held battery powered transmitter unit 18 is arranged to transmit coded radio frequency lock and unlock signals to the receiver 16 on pressing of lock and unlock buttons 20, 22.

Figure 2:
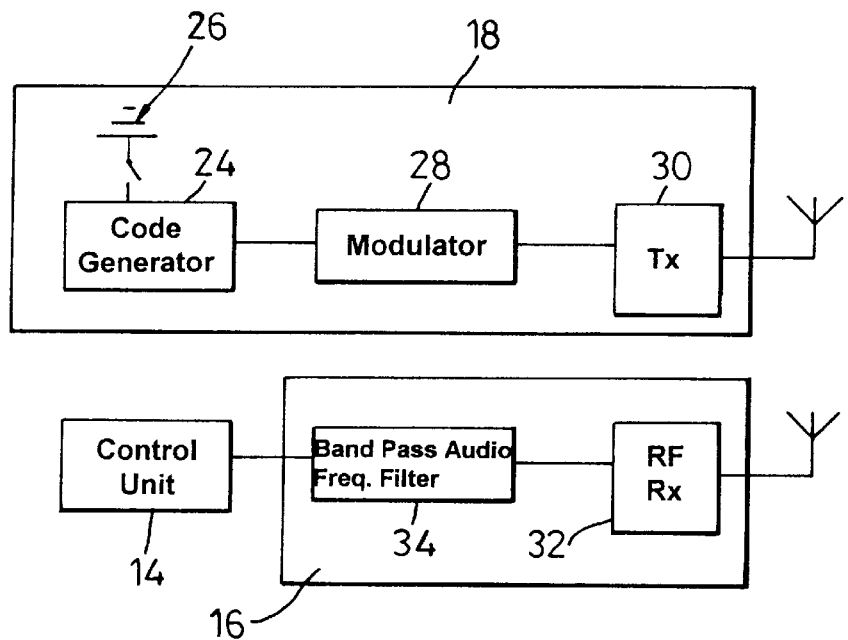
FIG. 2 is a diagrammatic representation of the transmitter and receiver of the system of FIG. 1, FIGS. 3a and 3b show the signals produced by the transmitter of FIG. 1.

Referring to FIG. 2, the transmitter unit 18 comprises a code generator 24 powered by a battery 26, a modulator 28 and a radio frequency transmitter 30. The receiver means 16 includes a radio frequency receiver 32 and a band pass audio frequency filter 34 which passes a narrow band of frequencies around 20 kHz. The filter 34 is then connected to the security control unit 14.

Figure 3A:
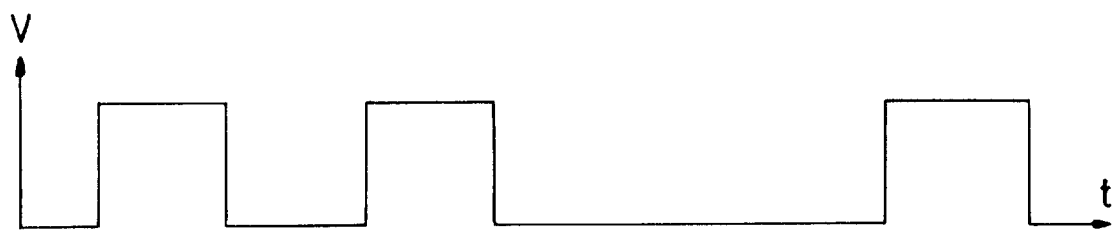
Figure 3B:
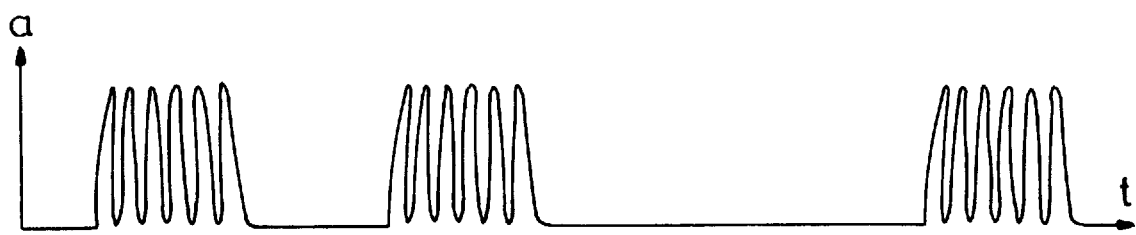

The code generator produces a pulsed electrical signal of the form shown in FIG. 3a comprising a coded series of pulses. The modulator 28 applies an amplitude modulation to the pulses at an audio frequency of 20 kHz. The modulated signal is shown in FIG. 3b. The transmitter then transmits the amplitude modulated signal as electromagnetic radiation at a radio frequency of 433.92 MHz.

Figure 4:
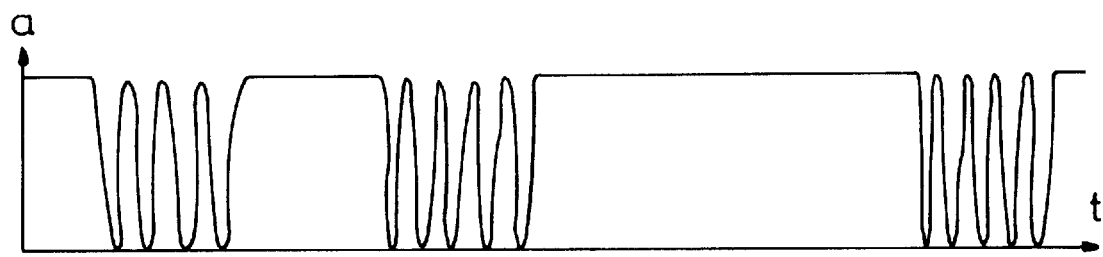
FIG. 4 shows an alternative form of signal to that shown in FIG. 3b.

Referring to FIG. 4, instead of the modulated signal comprising a series of amplitude modulated pulses with periods of zero signal between them, it can comprise a series of amplitude modulated pulses with a constant signal between them.

In the receiver unit 16, the transmitted signal is received by the receiver, passed through the filter 34 and then passed on to the control unit 14. The filter 34 therefore filters all signals received by the receiver 32 at 433.92 MHz, and only passes those which are amplitude modulated at frequencies in a narrow band around 20 kHz. The modulated signal from the transmitter therefore produces a pulsed signal from the filter 34 corresponding to that shown in FIG. 3a. All other signals which might be picked up by the receiver, for example from amateur radio operators, which are not amplitude modulated at around 20 kHz, will be filtered out and will not interfere with the operation of the security system.

If the interfering signal is very highly powered it may saturate the front end of the receiver 16, swamping it with a signal of such magnitude that it cannot operate properly. This can prevent the coded signal from being recovered. In order to avoid this a limiter can be provided in the receiver to limit the power of the signal entering the audio frequency filter 34. The limiter may take the form of a F.E.T. device driven as an automatic gain control, or may simply comprise a pair of diodes.

The modulator 28 and filter 34 are both programmable, i.e. they can have their characteristics programmed by means of software so as to take different forms or so as to vary with time. The audio frequency modulation can therefore also be made to vary in frequency over time, for example by changing between two or more frequencies at regular time intervals. This can have two advantages. One is that, in the event that there is an interfering signal at one of the audio frequencies used, a change in audio frequency may allow the system to operate by filtering out the interfering signal. Another is that the audio frequency filtering can be used to increase the security of the system. It is known, as described for example in our international patent application published as WO 94/19219, to provide a vehicle security system in which the code incorporated in the coded signal changes at regular intervals, the transmitter and receiver being kept in synchronism. The same principles can be applied to the audio frequency modulation and filtering described above. The audio-frequency of both the modulator 28 in the transmitter and the filter 34 in the receiver can easily be changed at desired intervals. It could therefore be arranged to cycle through a series of frequencies at regular intervals. Alternatively the frequency selected at each change could be chosen according to an algorithm, common to the transmitter and receiver, which would introduce an element of randomness. Also the time intervals between frequency changes could vary with time in accordance with a common algorithm.

Figure 5:
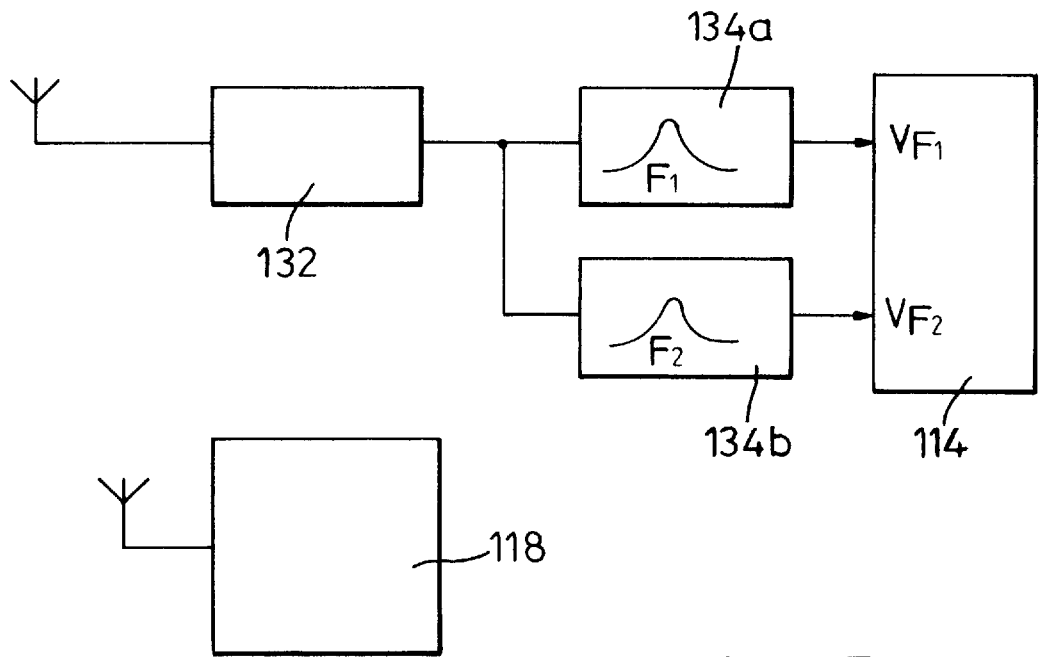
FIG. 5 is a diagrammatic representation of a second embodiment of the invention.
Figure 6A:
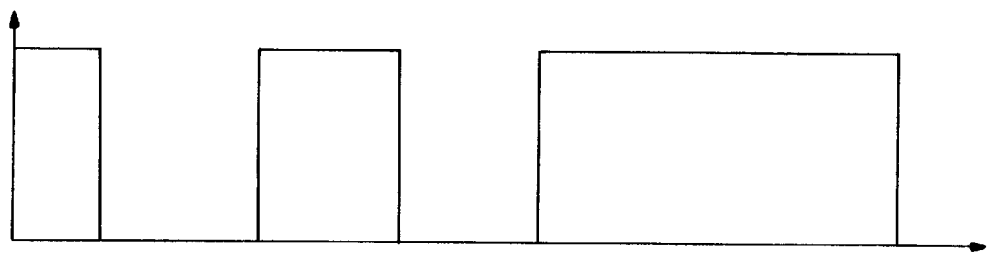
FIGS. 6a, 6b, 6c and 6d show signals produced in the system of FIG. 5.
Figure 6B:
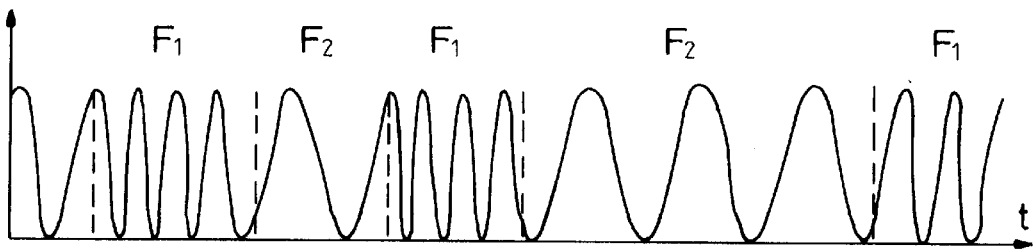

Referring to FIGS. 5 and 6, in a second embodiment of the invention, the transmitter unit 118, which corresponds to that in FIG. 2, is arranged to transmit the pulsed electrical signal, shown in FIG. 6a, as an RF signal which is continuous, having no gaps in it, but which comprises a series of parts of equal length, each of which is amplitude modulated at one of two frequencies $F_1$ and $F_2$, as shown in FIG. 6b. The pulses or 'highs' of the pulsed signal are transmitted as RF signals modulated at the first frequency $F_1$, and the gaps between the pulses, or 'lows', are transmitted as RF signals modulated at the second frequency $F_2$.

Figure 6C:
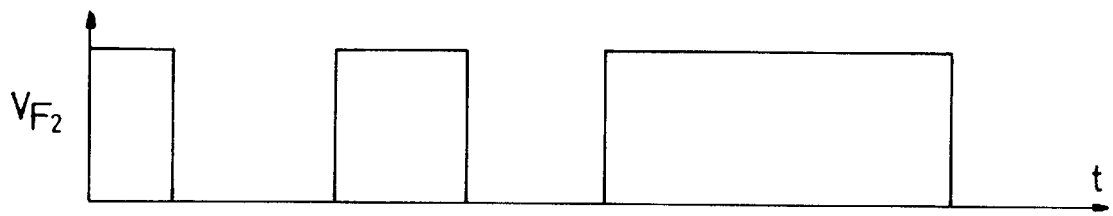
Figure 6D:
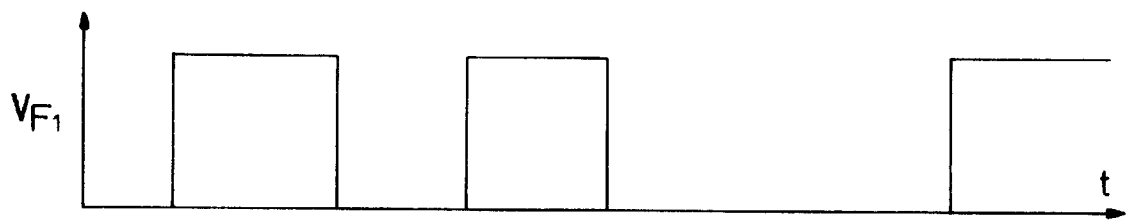
Figure 6E:
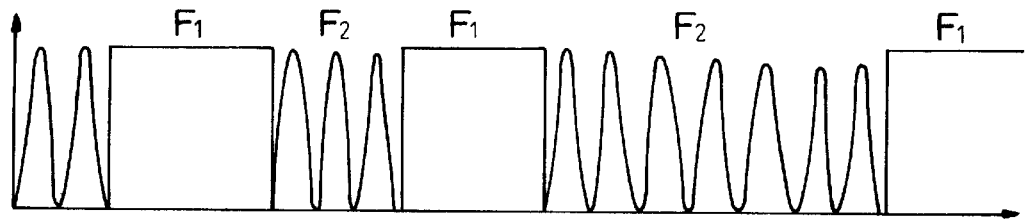
FIG. 6e shows a modification of the second embodiment of the invention.

The receiver unit of the second embodiment comprises an RF receiver 132, the output of which is fed to two parallel filters 134a and 134b which are band pass filters arranged to pass signals amplitude modulated at frequencies $F_1$ and $F_2$ respectively. The outputs from these filters are input to a control unit 114. The outputs from the filters 134a and 134b are shown in FIGS. 6c and 6d respectively, and it will be appreciated that one of them is the same as the pulsed coded electrical signal originally produced in the transmitter, and the other is the inverse of it. The control means is arranged to analyse the signals from each of the filters 134a and 134b and to read the data from one of the signals if the other has been corrupted. This means that, if there is interference at either of the frequencies $F_1$ or $F_2$, the signal from the unaffected filter 134a or 134b can still be used, and should not have been corrupted. Such interference can occur, for example, where there is an interfering RF signal, the radio frequency of which differs from that of the RF transmitter by a small amount, such that a beat frequency at $F_1$ or $F_2$ is produced A similar arrangement is shown on FIG. 6e which corresponds to that shown in FIGS. 6a to 6d, except that one of the modulating frequencies $F_1$ is zero. This has the advantage that the two modulating frequencies are very far apart so it is particularly easy for the filters to distinguish between them.

Figure 7:
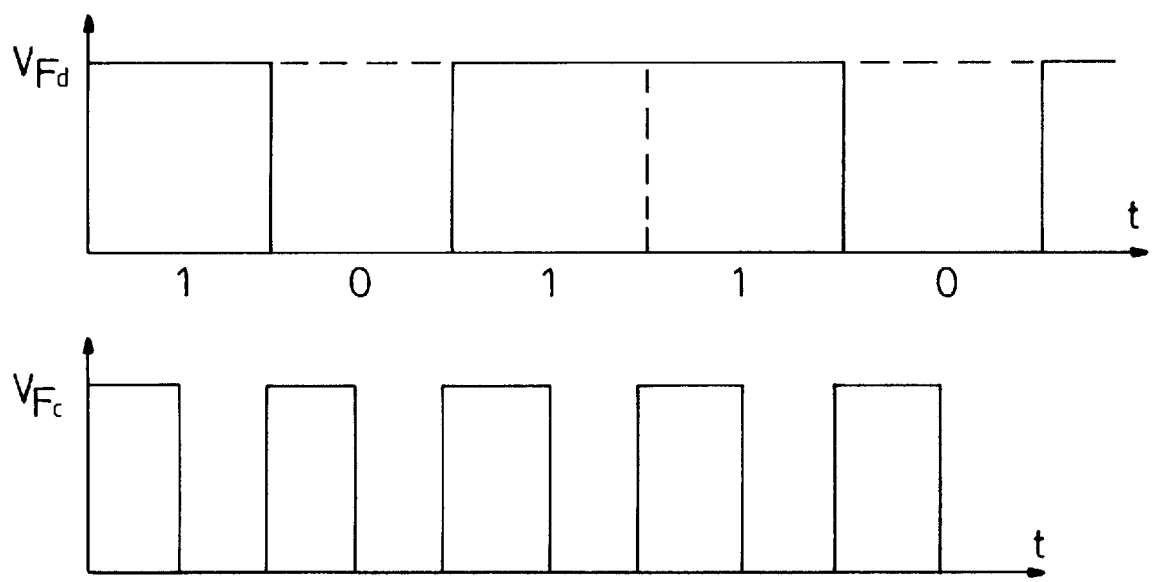
FIG. 7 shows the signals used in a third embodiment of the invention.

Referring to FIG. 7, in the third embodiment, the transmitter and receiver are the same as in the second embodiment, except that the transmitter can send separate signals at each of the modulating frequencies $F_1$ and $F_2$. The signal modulated at $F_1$ is used as a data signal as shown in FIG. 7a and that modulated at $F_2$ is used as a clock signal as shown in FIG. 7b. The data signal is of a simple form being split into periods, each of which is either high, when a signal is present, or low, when no signal is present. The clock signal comprises a series of pulses, each of which is half the length of the data bits and is timed to end in the middle of one of the data bits. The output from the $F_2$ filter therefore has a series of falling edges which can be used by the control unit 114 to time the reading of the data bits output from the $F_1$ filter.

As a further development of the arrangement shown in FIG. 7, it would be possible for each bit of the data signal to be amplitude modulated at one of two (or more) frequencies. This would allow each bit to have three (or more) possible 'values' 0, 1 or 2, thereby enabling more complicated coding of the signal such as 'trinary' code. Again one of the modulating frequencies can be zero.

What we claim is:

1. A vehicle security system comprising a security component, a transmitter for transmitting coded radio frequency signals including a coded series of pulses, receiving means for receiving said coded signals, and control means having a code stored therein and being arranged to compare coded signals received by the receiving means with the stored code to determine whether the coded series of pulses included in the received coded signals comprise a valid code, and to operate the security component in response to receipt by the receiver of a valid coded signal, wherein the transmitter includes modulating means for amplitude modulating said coded signals at a modulating frequency, and the receiving means includes filter means arranged to pass signals having an amplitude modulation frequency within a range including said modulating frequency, whereby the filter means reproduces the coded series of pulses from the amplitude modulated signal from the transmitter and other signals which are not amplitude modulated by a signal having a frequency within the range of said modulating frequency are filtered out and will not interfere with the operation of said security system, wherein the modulating means can produce amplitude modulation of the signals at either of two different modulating frequencies and the receiving means includes two said filtering means each of which is arranged to pass signals having an amplitude modulation frequency at a respective one of said two frequencies, wherein the transmitter is arranged to produce the coded signal by producing a continuous signal and modulating the whole of said continuous signal at a modulating frequency which alternates between said two modulating frequencies such that when the receiving means receives the coded signal the output from each of said filtering means is the inverse of the other.

2. A system according to claim 1 wherein the filter means is a band pass filter.

3. A system according to claim 1 wherein one of the modulating frequencies is zero.

4. A system according to claim 1 wherein the control means includes analyzing means for analyzing the signals from each of the filtering means and determining whether said signals have been corrupted, and is arranged to read one of said signals if the other has been corrupted.

5. A system according to claim 1 wherein the coded signal comprises a sequence of pulses of electromagnetic radiation.

6. A system according to claim 1 wherein the coded signal comprises a sequence of pulses of electromagnetic radiation and the modulating means is arranged to modulate each of the pulses at one of the modulating frequencies.

7. A system according to claim 1 wherein the coded signal comprises a series of code portions, each of which has a single modulation frequency and represents a single bit of a code, the value of which is defined by the modulation frequency.

8. A system according to claim 1 wherein the modulation frequency is in the audio-frequency range.

9. A system according to claim 1 wherein the modulation frequency is higher than about 4 kHz.

10. A system according to claim 1 wherein the modulating frequency of the transmitter and the frequency range of the filtering means are arranged to vary in time, in synchronism with each other.

11. A system according to claim 1 wherein the security component comprises an engine immobilizer.

12. A system according to claim 1 wherein the security component comprises a door locking mechanism.

13. A vehicle security system comprising a security component, a transmitter for transmitting coded radio frequency signals, receiving means for receiving said coded signals, and control means having a code stored therein and being arranged to compare coded signals received by the receiving means with the stored code to determine whether the received codes are valid, and to operate the security component in response to receipt by the receiver of a valid coded signal, wherein the transmitter includes modulating means for producing amplitude modulation of the radio frequency signal at a modulating frequency, and the receiving means includes filter means arranged to pass signals having an amplitude modulation frequency within a range including said modulating frequency, the modulating means can produce amplitude modulation of the signals at one of two different modulating frequencies and the receiving means includes two said filtering means each of which is arranged to pass signals having an amplitude modulation frequency at a respective one of said two frequencies, the coded signal comprises a series of code portions, each of which has a single modulation frequency and represents a single bit of a code having a value defined by the modulation frequency, and the value of each bit is further defined by the presence or absence of a signal in a respective portion of the signal.

14. A vehicle security system comprising a security component, a transmitter for transmitting coded radio frequency signals, receiving means for receiving said coded signals, and control means having a code stored therein and being arranged to compare coded signals received by the receiving means with the stored code to determine whether the received codes are valid, and to operate the security component in response to receipt by the receiver of a valid coded signal, wherein the transmitter includes modulating means for producing amplitude modulation of the radio frequency signal at a modulating frequency, and the receiving means includes filter means arranged to pass signals having an amplitude modulation frequency within a range including said modulating frequency, the modulating means can produce amplitude modulation of the signals at one of two different modulating frequencies and the receiving means includes two said filtering means each of which is arranged to pass signals having an amplitude modulation frequency at a respective one of said two frequencies, and the transmitter is arranged to transmit a clock signal which is amplitude modulated at one modulating frequency, and a data signal which is amplitude modulated at at least one other modulating frequency.

* * * * *